United States Patent [19]

Corsi et al.

[11] Patent Number: 4,872,534
[45] Date of Patent: Oct. 10, 1989

[54] WHEELED CHAIR RESTRAINT

[76] Inventors: Vincent R. Corsi, 161 Princeton Ave., Coventry, R.I. 02816; Gaetano W. Citrone, 9 Gordon St., Johnston, R.I. 02919

[21] Appl. No.: 260,577

[22] Filed: Oct. 21, 1988

[51] Int. Cl.[4] ............................................. B60T 3/00
[52] U.S. Cl. ............................................. 188/32; 188/2 F
[58] Field of Search ............................................. 188/2 F, 32

[56] References Cited

U.S. PATENT DOCUMENTS

| | | | |
|---|---|---|---|
| 1,282,764 | 10/1918 | Daly | 188/32 X |
| 2,079,992 | 5/1937 | Gonzalez | 188/32 |
| 2,870,872 | 1/1959 | Rapp | 188/32 |
| 4,027,747 | 6/1977 | Moorman | 188/2 F X |

FOREIGN PATENT DOCUMENTS

| | | | |
|---|---|---|---|
| 371775 | 2/1907 | France | 188/32 |
| 1250144 | 11/1960 | France | 188/32 |
| 0035077 | 3/1977 | Japan | 188/32 |

*Primary Examiner*—Duane A. Reger
*Attorney, Agent, or Firm*—Barlow & Barlow, Ltd.

[57] ABSTRACT

A restraint apparatus for wheeled chairs has a pair of spaced bumper bars that engage the outer edges of the front and rear pairs of wheels and retain the geriatric patient in a fixed position in a nursing facility.

5 Claims, 1 Drawing Sheet

WHEELED CHAIR RESTRAINT

BACKGROUND OF THE INVENTION

This invention relates generally to a Geri chair restraint device which can also be utilized with wheelchairs and will hold a wheeled chair on the floor of a hospital or nursing facility and restrict the ability for the patient to move around without an attendant.

There are a number of devices in the prior art which will restrain wheeled chairs and, more particularly, to restrain wheel chairs when they are being transported in vehicles. Generally, these devices take the form of some hold-down device that will clamp the wheelchair to the floor of a vehicle and have some means preventing it from moving laterally as well as longitudinally.

SUMMARY OF THE INVENTION

The wheeled chair restraining apparatus of the present invention comprises basically a framework that engages the rear and front wheels of a Geri chair or a wheelchair together with a device to prevent the forward tipping of a Geri chair by a patient. In essence, the framework holds the Geri chair between a pair of spaced bumpers; one bumper for the forward wheel being lower than the rear bumper so that an attendant may move the patient when desired.

It is the principal object, therefore, of this invention to provide a simple apparatus for restraining the movement of Geri chairs in nursing homes and other medical facilities so that the patients may not further injury themselves.

DESCRIPTION OF THE PREFERRED EMBODIMENT

Figure 1:
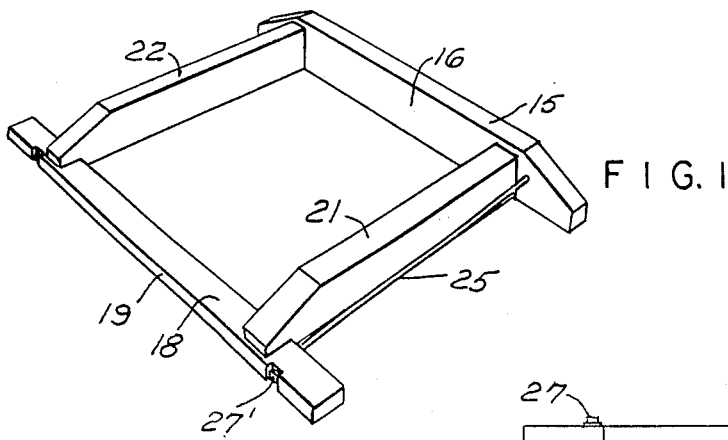
FIG. 1 is a perspective view of the restraining apparatus of the present invention.
Figure 2:
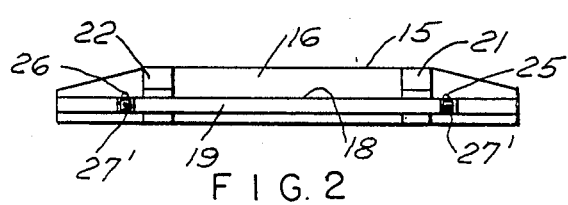
FIG. 2 is a front, elevational view thereof.
Figure 3:
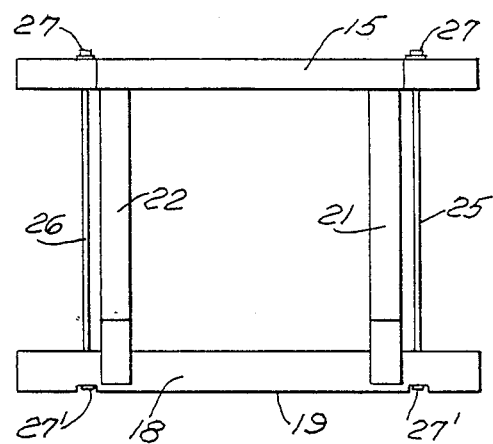
FIG. 3 is a top view.
Figure 4:
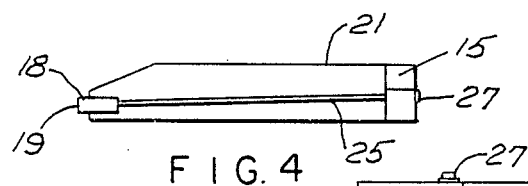
FIG. 4 is a side elevational view.
Figure 5:
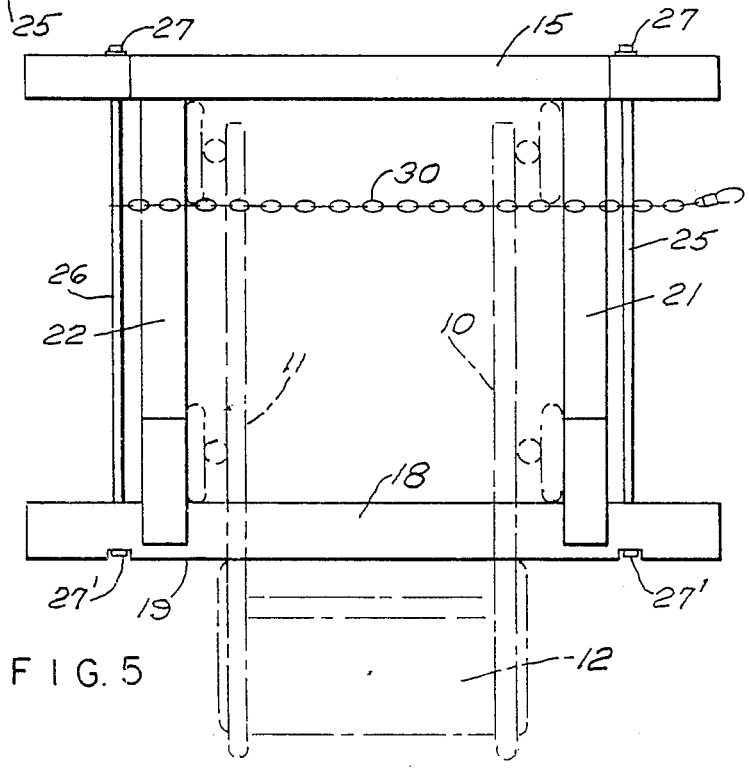
FIG. 5 is an enlarged top view showing the Geri chair rolling mechanism in broken lines.

Referring first to FIG. 5 of the drawings, there is illustrated in phantom, a Geri chair restrained in a rectangular framework. The Geri chair consists essentially of a tubular frame including a bottom rods 10, 11 and the tubular frame has mounted thereon four wheels there being a forward pair and a rearward pair. The chair is also generally characterized by a footrest 12 of some form as illustrated. The rectangular framework comprises a rear bumper bar 15 which is oriented as a rectangular piece with its highest side, such as 16, arranged in a vertical direction. A second restraining bumper bar 18 is arranged so that its shorter side 19 is vertical and the two are maintained in a spaced relationship by spacer or spreader bar members 21 and 22. The entire structure is made rigid by means of tie rods such as 25, 26 that have threaded nut engagement as at 27, 27', with the face of the bars 15 and 18 to maintain a rigid structure.

There is an opportunity for a Geri chair to be tipped by the patient and even though the patient is restrained by means of a seat strap, for sometimes a patient can utilize their weight in such a way as to try to rock the chair forward. To prevent this from occurring, a restraining chain 30 extending between tie rods 25, 26 or other means to engage the side-bars 10 and 11 of the Geri chair, may be provided.

In its simplest form, the rectangular frame may be made out of what is known as 2×4 lumber and the dimensions of the rear bar 15 may be altered to accommodate the larger wheel of a wheelchair. Essentially therefore, the invention provides a movable restraint that can be repositioned in corridors and common rooms of nursing facilities and yet restrain the patient. In use it will be apparent that an attendant may easily roll the chair out of the restraint and over the front bumper bar 18 that in the preferred form of the invention is about 1.75 inches high.

We claim:

1. A restraint apparatus for a wheeled patient chair having front and rear pairs of wheels comprising
   a first bumper bar adapted to engage one pair of wheels of a chair;
   a second bumper bar of a height substantially half the height of the first bar spaced from and substantially parallel to the first bar and adapted to engage the other pair of wheels;
   means maintaining the first and second bars in a spaced relation whereby the wheeled chair may with external assistance be forced over the second bar to move the patient.

2. A restraint apparatus as in claim 1 wherein means are provided for holding the rear wheeled portion of the chair against the first bar of frame.

3. A restraint apparatus as in claim 1 wherein the means for maintaining the first and second bars in spaced relation comprises a pair of spreader bar members and a tie rod to clamp the bumper bars together.

4. In combination with a Geri chair having four substantially identical wheels, a rectangular frame, said frame having spaced bumper bars and frame members, said bars spaced apart by frame members a distance substantially equal to the outer distance of a pair of wheels, one bar being substantially one half the height of the other bar whereby the chair is restrained from normal wheel movement and yet can be moved over the lower bar with external assistance and thereby move a patient.

5. A combination as in claim 4 wherein a flexible restraint is fastened between the frame members across the framework of a Geri chair.

* * * * *